United States Patent [19]

Pinigis

[11] Patent Number: 4,946,593
[45] Date of Patent: Aug. 7, 1990

[54] RUBBER COMPOSITION FOR USE WITH POTABLE WATER

[75] Inventor: Edward P. Pinigis, Fairhaven, Mass.

[73] Assignee: Acushnet Company, New Bedford, Mass.

[21] Appl. No.: 401,495

[22] Filed: Aug. 29, 1989

Related U.S. Application Data

[60] Continuation of Ser. No. 103,435, Sep. 30, 1987, abandoned, which is a division of Ser. No. 32,873, Mar. 31, 1987, abandoned.

[51] Int. Cl.$^5$ .............................................. B01D 39/00
[52] U.S. Cl. ................................ 210/500.36; 525/348; 525/352
[58] Field of Search ............... 210/654, 500.27, 500.36

[56] References Cited

U.S. PATENT DOCUMENTS

| | | | |
|---|---|---|---|
| 3,281,387 | 10/1966 | Wood | 525/332.5 |
| 3,531,444 | 9/1970 | Behrens | 525/348 |
| 3,533,980 | 10/1970 | Minuto | 525/351 |
| 3,544,531 | 12/1970 | Morita | 525/341 |
| 3,657,113 | 4/1972 | Stancell | 210/654 |
| 3,931,121 | 1/1976 | Davis | 525/332.5 |
| 4,012,567 | 3/1977 | Loveless | 525/332.5 |
| 4,209,596 | 6/1980 | Hashimoto et al. | 525/340 |

FOREIGN PATENT DOCUMENTS

| | | |
|---|---|---|
| 35271 | 9/1981 | European Pat. Off. . |
| 0184179 | 6/1986 | European Pat. Off. . |
| 14017 | 4/1972 | Japan . |
| 0788874 | 1/1958 | United Kingdom . |
| 0858136 | 1/1961 | United Kingdom . |
| 1127102 | 9/1968 | United Kingdom . |
| 1236079 | 6/1971 | United Kingdom . |

*Primary Examiner*—Christopher Henderson
*Attorney, Agent, or Firm*—Lucas & Just

[57] ABSTRACT

A rubber composition for use with potable water is disclosed. The composition is based on butyl rubber. The accelerator system is carbamate-free and the composition preferably includes coal-derived carbon black. Improvements in processing are also disclosed.

9 Claims, No Drawings

RUBBER COMPOSITION FOR USE WITH POTABLE WATER

This is a continuation of application Ser. No. 103,435 filed Sept. 30, 1987, now abandoned, which in turn was a division of application Ser. No. 032,873 filed Mar. 31, 1987, also now abandoned.

The present invention relates to rubber compositions and, in particular, butyl rubber compositions for use with potable water.

The use of butyl rubber compositions is rather widespread in areas where flexibility is required. Butyl rubbers are copolymers of isobutylene with a small percentage of a diolefin. The diolefin is frequently isoprene or butadiene but other $C_3$–$C_6$ diolefins can be utilized. The diolefin is used to provide sites for vulcanization. The amount of diolefin is usually from about 0.5 to about 5% and commercially available products today typically have about 2 to 3% diolefin.

Butyl rubbers are generally made with one or more accelerators, fillers, and other ingredients as specified hereinafter. Because of their excellent elasticity and impermeability, butyl rubbers are commonly used in potable water systems, especially as diaphragms.

Conventional butyl rubber compositions used in potable water systems are generally acceptable. However, it has sometimes been noted that potable water has objectionable taste, especially where the water has a high residence time in a system where butyl rubber parts are employed. While this can occur in any potable water system, the incidence of objectionable taste has been found to occur most often in water systems which have a high residence time, such as filters used in reverse osmosis.

The applicants have now discovered a butyl rubber composition which has little or no effect on the taste of potable water despite high residence time such as in reverse osmosis filters. The applicants achieve this by using a carbamate-free accelerator system, preferably in combination with the use of one or more of: (a) carbon black as the filler, (b) a post-cure of the rubber composition, and (c) the elimination of the use of plasticizers or the use of only non-volatile plasticizers.

As stated hereinbefore, the base rubber is a butyl rubber. In accordance with standard rubber industry practice, the other ingredients are specified in terms of one hundred parts by weight of butyl rubber. In discussing the other ingredients below, applicants will use the expression "phb" which is an semi-acronym for "parts per hundred parts butyl rubber".

In order to cure the butyl rubber, it is necessary to use an accelerator or, more usually, a system of accelerators. The accelerators are sulfur-based compounds and vulcanize the rubber. The total amount of accelerator is usually about 1 to 5 phb, preferably about 1 to 3 phb. The applicants have found that carbamate accelerators contribute to the taste problem when butyl rubbers are used in a potable water system. A commonly used accelerator is zinc dimethyldithiocarbamate. Examples of suitable accelerators which do not contain carbamate are the thiurams, thiazoles, and sulfenamides.

It is necessary to have fillers in a butyl rubber composition. The total amount of filler is about 20 to 100 phb, preferably about 40 to 80 phb. Typically used fillers are silica and carbon black. In accordance with the present invention, it is preferred that at least about one half of the filler be carbon black and it is more preferred that the filler be at least about 75% carbon black. Carbon blacks, which have been known since antiquity, are made by combustion of hydrocarbon fuels with insufficient air. In accordance with the present invention it is preferred that the butyl rubber composition also include about 1 to 30 phb of coal-derived carbon black, more preferably about 5 to 25 phb. The carbon black and silica are preferably used in a plurality of particle sizes.

No matter what their source, the carbon blacks can be of the activated type, if desired. Activated carbon can be prepared in a variety of ways, including treatment with a gas such as steam or hot air or treatment with a chemical such as metal chlorides or phosphoric acid.

An activator in the amount of about 3 to 10 phb, preferably about 4 to 6 phb, is employed. The activator is typically a metal oxide such as magnesium oxide or zinc oxide; of these two, zinc oxide is preferred for its greater activating properties.

The butyl rubber composition of the present invention preferably also includes about 0 to 2 phb of a fatty acid, more preferably about 0.75 to 1.5 phb. The fatty acid functions as both an activator and a dispersion agent. The fatty acid is preferably of higher molecular weight, i.e. $C_{14}$–$C_{24}$. A combination of different fatty acids can be employed, if desired.

The butyl rubber composition preferably also includes a paraffin wax in the amount of about 0 to 3 phb, preferably about 1 to 3 phb. A paraffin wax acts as a processing aid and also increases ozone resistance of the composition.

Sulfur may also be included in the amount of about 0 to 3 phb, preferably about 1 to 3 phb. While not necessary, this compound is of substantial benefit in preparation of the composition since it reduces the amount of accelerators required.

Plasticizers are normally used in butyl rubber compositions. Plasticizers are typically hydrocarbon-based oils. In accordance with the present invention it has been found that, over time, plasticizers will sometimes be extracted into the water at a sufficient degree to cause a taste and/or odor problem. In accordance with the present invention it is preferred that no plasticizer be employed. If a plasticizer is employed, it is preferred that it have minimal or, more preferably, no extractability into water.

The rubber compositions of the present invention are made by standard butyl rubber processing techniques. In standard butyl rubber processing techniques, all of the ingredients are mixed with the exception of the accelerators and, if used, the sulfur. After mixing at an elevated temperature for a period of time, the accelerators and sulfur are added to the other ingredients and the mixing is continued. The part, such as a diaphragm, is then molded from this composition, frequently from a pre-formed, extruded slug of the composition.

In accordance with the present invention, it is preferred that the rubber part be post-cured. Post curing is carried out after the part is molded. It is preferred that it be done at a temperature above about 200° F. (93° C.) for at least about 1 hour and is more preferably carried out for at least about 2 hours.

These and other aspects of the present invention may be more fully understood with reference to the following examples:

EXAMPLE 1

In this example, a rubber diaphragm was prepared for use in a filter for a potable water system which employs reverse osmosis. The composition consisted of 100 parts butyl rubber and, per hundred parts butyl rubber (phb), the following ingredients:

| | | |
|---|---|---|
| | Stearic acid | 1.0 |
| | Paraffin wax | 1.5 |
| | Silica | 20.0 |
| | Hydrocarbon plasticizer | 2.0 |
| | Carbon black | 50.0 |
| | Dipentamethylenethiuram disulfide | 0.35 |
| | Zinc dimethyldithiocarbamate | 0.5 |
| | Tetramethylthiuram disulfide | 1.0 |
| | Sulfur | 2.0 |
| | Zinc oxide | 5.0 |

The above composition was made into test pieces for taste testing using standard rubber processing techniques. All of the ingredients except for the accelerators and the sulfur were mixed on a Banbury mixer at about 300° F. (150° C.) for about 8 minutes. The thus-formed composition was removed from the Banbury mixer and cooled to ambient temperature whereupon the accelerators and sulfur were added. This composition was then returned to the Banbury mixer for additional mixing for about 3-4 minutes at about 200° F. (93° C.). Slugs were extruded from this composition and the slugs were subsequently compression molded into 1-inch (2.54 cm) squares of about ¼-inch (0.6 cm) thickness at 340° F. (171° C.) for 5-6 minutes.

After the squares were cooled, fifteen of them were added to a pint of taste- and odor-free water. The water with the squares in it was stored for 24 hours at ambient temperature. A panel of taste testers then tasted the water and found it to have slight to moderate taste and slight to moderate odor.

EXAMPLE 2

Example 1 was repeated except that the butyl rubber formulation was made in accordance with the present invention. The butyl rubber composition contained, per 100 parts butyl rubber, the following ingredients:

| | | |
|---|---|---|
| | Stearic acid | 1.0 |
| | Paraffin wax | 1.5 |
| | Silica | 20.0 |
| | Carbon black | 50.0 |
| | Dipentamethylenethiuram hexasulfide | 0.35 |
| | Tetramethylthiuram disulfide | 1.0 |
| | Sulfur | 2.0 |
| | Zinc oxide | 5.0 |
| | Coal-derived carbon black | 20.0 |

This composition was prepared into test pieces in the same manner as the compound of Example 1 except that, after the compression molding step, the pieces were subjected to a post-cure at 300° F. (150° C.) for about 3 hours.

In the taste test, using the same water and the same taste panel as in Example 1, the water was found to contain no or only a very slight taste and no or only a very slight odor.

EXAMPLE 3

Example 2 is repeated except that the paraffin wax, the stearic acid, and the sulfur are not used. Comparable results are obtained.

EXAMPLE 4

Example 2 is repeated except that no post-cure is employed. The results are substantially better than those of Example 1 and almost as good as those of Example 2.

EXAMPLE 5

Example 2 is repeated except that no coal-derived carbon black is employed. While the results obtained are better than those of Example 1, they are noticeably less good than the results of Example 2.

It will be understood that the claims are intended to cover all changes and modifications of the preferred embodiments of the invention herein chosen for the purpose of illustration which do not constitute departures from the spirit and scope of the invention.

What is claimed is:

1. In a water system for potable water including one or more parts being of butyl rubber, the improvement comprising said one or more parts being made from a rubber composition comprising butyl rubber and, per hundred parts butyl rubber (phb), the following ingredients:

| | | |
|---|---|---|
| | Carbamate-free accelerator | 1-5 phb |
| | Filler | 20-100 phb |
| | Activator | 3-10 phb |
| | Paraffin wax | 0-3 phb |
| | Sulfur | 0-5 phb |
| | Fatty acid | 0-2 phb | said carbamate-free accelerator minimizing objectionable taste transmitted to potable water by said butyl rubber composition.

2. A system according to claim 1 wherein the said one or more parts is a diaphragm.

3. The composition of claim 1 wherein at least about one half of the filler is carbon black.

4. The composition of claim 1 wherein at least about 75% of the filler is carbon black.

5. The composition of claim 1 further including 10 to 30 phb coal-derived carbon black.

6. The composition of claim 1 wherein the sulfur is coated with magnesium oxide.

7. The composition of claim 1 wherein the filler comprises carbon black and silica.

8. The composition of claim 7 wherein silica of different particle sizes is employed.

9. The composition of claim 7 wherein carbon black of different particle sizes is employed.

* * * * *